United States Patent
Dang et al.

(10) Patent No.: US 7,265,198 B2
(45) Date of Patent: Sep. 4, 2007

(54) SULFONATED POLYARYLENETHIOETHERSULFONE POLYMER AND COPOLYMER COMPOSITIONS

(75) Inventors: Thuy D. Dang, Centerville, OH (US); Michael F. Durstock, Chester, OH (US); Zongwu Bai, Beavercreek, OH (US); Matthew J. Dalton, Xenia, OH (US)

(73) Assignee: University of Dayton, Dayton, OH (US)

( * ) Notice: Subject to any disclaimer, the term of this patent is extended or adjusted under 35 U.S.C. 154(b) by 207 days.

(21) Appl. No.: 11/005,248

(22) Filed: Dec. 6, 2004

(65) Prior Publication Data

US 2005/0165213 A1    Jul. 28, 2005

Related U.S. Application Data

(60) Provisional application No. 60/558,058, filed on Mar. 31, 2004, provisional application No. 60/530,406, filed on Dec. 17, 2003.

(51) Int. Cl.
*C08G 75/02* (2006.01)
*C08G 75/04* (2006.01)
*C08G 75/20* (2006.01)

(52) U.S. Cl. .................. 528/373; 528/375; 528/378; 528/391; 528/503

(58) Field of Classification Search ............... 528/373, 528/375, 391, 503, 378
See application file for complete search history.

(56) References Cited

FOREIGN PATENT DOCUMENTS

WO    WO 03/082956 A1    10/2003

OTHER PUBLICATIONS

Abstracts of Papers, 225th ACS National Meeting, New Orleans, LA, Mar. 23-27, 2003, Poly-626 Publisher: American Chemical Society, Washington, D.C. ; Coden: 69DSA4, 2003, XP009044785 p. 626.

Polymer Preprints (American Chemical Society, Division of Polymer Chemistry), 44(1), 1089-1090 Coden: ACPPAY: ISSN: 0032-3934, 44(1), 1089-1090 Coden: ACPPAY; ISSN: 0032-3934; vol. 44, No. 1, 2003, pp. 1089-1090, XP009044098, p. 1089, Col. 1, Para. 1, Scheme 2.

Chemicals Abstracts Service, Columbus, OH, Mar. 18, 2003, Wiles, K.B., et al. "Poly(arylene thioether sulfone) copolymers for PEM-based fuel cell systems", XP002319960, retrieved from STN Database accession No. 2003:211268 abstract.

Bai, Zongwu, et al.; Properties and Proton Conductivities of Highly Sulfonated Polyarylenethioethersulfones for Fuel Cells (Article) Feb. 2004.

Dang, Thuy, et al.; Synthesis and Characterization of Highly Sulfonated Polyarylenethioethersulfones for Fuel Cells Applications (Article) Feb. 2004.

Wiles, K.B., et al.; Synthesis and Characterization of Sulfonated Poly(arylene Sulfide Sulfone) Copolymers as Candidates for Proton Exchange Membranes (Article) Feb. 2004.

(Continued)

*Primary Examiner*—Duc Truong
(74) *Attorney, Agent, or Firm*—Dinsmore & Shohl LLP (57) ABSTRACT

A sulfonated polyarylenethioethersulfone polymer and copolymer. The sulfonated polyarylenethioethersulfone polymer and copolymer comprises the reaction product of an aromatic dihalo functionality sulfonated monomer, an aromatic dithiol monomer, and optionally an aromatic dihalo functionality monomer. The invention also relates to methods of making the sulfonated polyarylenethioethersulfone polymer and copolymer, and to membranes made from the sulfonated polyarylenethioethersulfone polymer and copolymer.

31 Claims, 9 Drawing Sheets

OTHER PUBLICATIONS

Zawodinski, Thomas A. et al.; Water Uptake by and Transport Through Nafion® 117 Membranes; J. Electrochem. Soc., vol. 140, No. 4, Apr. 1993, © The Electrochemical Society, Inc.; pp. 1041-1047.

Matsumura, Sumiko, et al.; Synthesis and Properties of Novel Aromatic Poly(thioether-Ketone)s as Sulfur-Containing High-Performance Polyers; Macromolecules 2001; vol. 34, No. 9, 2001, pp. 2848-2853.

Allam, Christopher, et al.; Preparation and Properties of Novel Aromatic Poly(thioethers) Derived from 4,4'-Thiobisbenzenethiol; Macromol. Chem. Phys. 200, No. 8 (1999); pp. 1854-1862; WILEY-VCH Verlag GmbH, D-69451 Weinheim, 2001.

Wang, Feng, et al.; Synthesis of Highly Sulfonated Poly(arylene ether sulfone) Random (Statistical) Copolymers Via Direct Poly merization; Macromol. Symp. 175 (2001); pp. 387-395; WILEY-VCH Verlag GmbH, D-69469 Weinheim, 2001.

Wang, Feng, et al.; Direct Polymerization of Sulfonated Poly(arylene ether sulfone) Random (Statistical) Copolymers: Candidates for New Proton Exchange Membranes; Journal of Membrane Science 197 (2002); pp. 231-242; © 2002 Elsevier Science B.V.

Ueda, Mitsuru, et al.; Synthesis and Characterization of Aromatic Poly(ether Sulfone)s Containing Pendant Sodium Sulfonate Groups; Journal of Polymer Science: Part A: Polymer Chemistry, vol. 31, pp. 853-858 (1993) © 1993 John Wiley & Sons, Inc.

Dang, Thuy, et al.; Synthesis and Characterization of Highly Sulfonated Polyarylenethioethersulfones for Fuel Cells Applications pp. 1-22 (Presentation); Mar. 28, 2004.

Bai, Zongwu, et al.; Properties and Proton Conductivties of Highly Sulfonated Polyarylenethioethersulfones for Fuel Cells pp. 1-17 (Presentation); Mar. 29, 2004.

SULFONATED POLYARYLENETHIOETHERSULFONE POLYMER AND COPOLYMER COMPOSITIONS

CROSS REFERENCE TO RELATED APPLICATIONS

This application claims the benefit of U.S. Provisional Application No. 60/530,406, entitled Sulfonated Polyarylenethioethersulfone Polymer Compositions, filed Dec. 17, 2003; and U.S. Provisional Application No. 60/558,058, entitled Sulfonated Polyarylenethioethersulfone Copolymers, filed Mar. 31, 2004, both of which are incorporated herein by reference.

BACKGROUND OF THE INVENTION

This invention relates generally to polymer compositions, and more particularly to sulfonated polyarylenethioethersulfone polymer and copolymer compositions.

Over the last decade, several new proton conducting polymer electrolyte membranes have emerged. The new polymers in fuel cell applications are based mostly on hydrocarbon structures for the polymer backbone. These new membrane concepts include fluorinated, partially fluorinated, composite, and aromatic polymer membranes.

Due to their chemical stability, high degree of proton conductivity, and mechanical properties, perfluorinated polymer electrolytes available from companies such as DuPont (Nafion®), Asahi Chemical (Aciplex®), and Asahi Glass (Flemion®), and membranes available from Dow Chemical, are some of the most promising proton exchange membranes (PEMs). They serve as the benchmark for future development of polymer electrolyte fuel cells.

While perfluorinated polymer electrolytes have satisfactory properties for fuel cell membrane applications, especially at temperatures up to 80° C., they have low proton conductivities at temperatures over about 80° C., and at low humidity. In addition, perfluorinated polymer electrolytes are expensive.

SUMMARY OF THE INVENTION

Therefore, there remains a need for improved polymer and copolymer compositions, methods of making the improved polymers and copolymers, and for membranes made from the polymers and copolymers.

This invention meets that need by providing new chemical structures based on arylenethioether sulfone polymer compositions containing sulfonic acid pendent groups for proton conducting polymer electrolyte membranes. The materials will be useful in a number of different membrane applications including, but not limited to, fuel cells, electrodialysis, and reverse osmosis.

The sulfonated polyarylenethioethersulfone polymers and copolymers comprise the reaction product of an aromatic dihalo functionality sulfonated monomer, an aromatic dithiol monomer, and optionally an aromatic dihalo functionality monomer.

Another aspect of the invention is a method of making a sulfonated polyarylenethioethersulfone polymer and copolymer. One method comprises reacting an aromatic dihalo functionality sulfonated monomer, an aromatic dithiol monomer, and optionally an aromatic dihalo functionality monomer to form the sulfonated polyarylenethioethersulfone polymer and copolymer.

Another aspect of the invention is a membrane made from the sulfonated polyarylenethioethersulfone polymer and copolymer.

DETAILED DESCRIPTION OF THE INVENTION

The compositions of the present invention have an all aromatic polymer backbone combined with a high sulfonic acid content that enhances water retention and allows use at temperatures above 80° C., including high temperature applications above 120° C. The presence of two (or less, but more than one) sulfonic acid units per polymer repeat unit is expected to maximize the membrane water uptake, as well as the proton conductivity.

The new class of materials is useful for making membranes, including, but not limited to, polymer electrolyte membranes. The sulfonated polyarylenethioethersulfone polymers and copolymers of the present invention have been demonstrated to be equal or superior to the state-of-the-art Nafion® membranes with respect to proton conductivity as well as high temperature PEM use. The proton conductivity of the sulfonated polyarylenethioethersulfone polymers and copolymers of the present invention was found to increase by a factor of about one to three over Nafion® under comparable conditions. The improvement is believed to be due to the sulfonic acid content. The end-capped version of the sulfonated polyarylenethioethersulfone polymers and copolymers of the present invention takes advantage of the bulky aromatic end group, which results in decreased water solubility and improved high temperature PEM use.

The general preparation of polyarylenethioethersulfone involves a nucleophilic displacement reaction of the activated aromatic halide groups in the monomer by alkali metal aromatic thiolate anions derived from the aromatic dithiol monomer. The sulfonated polyarylenethioethersulfone polymers and copolymers were synthesized using tetrahydrothiophene-1,1-dioxide (sulfolane) as the solvent. However, the polymerization may be accomplished using other polar aprotic solvents including, but not limited to, dimethylsulfoxide (DMSO), N,N-dimethylacetamide (DMAc), and N-methylpyrrolidinone (NMP). The sulfonated polyarylenethioethersulfone polymers and copolymers were synthesized using anhydride potassium carbonate. However, other active agents, including, but not limited to, sodium carbonate, and sodium hydroxide can also be used.

Figure 1:
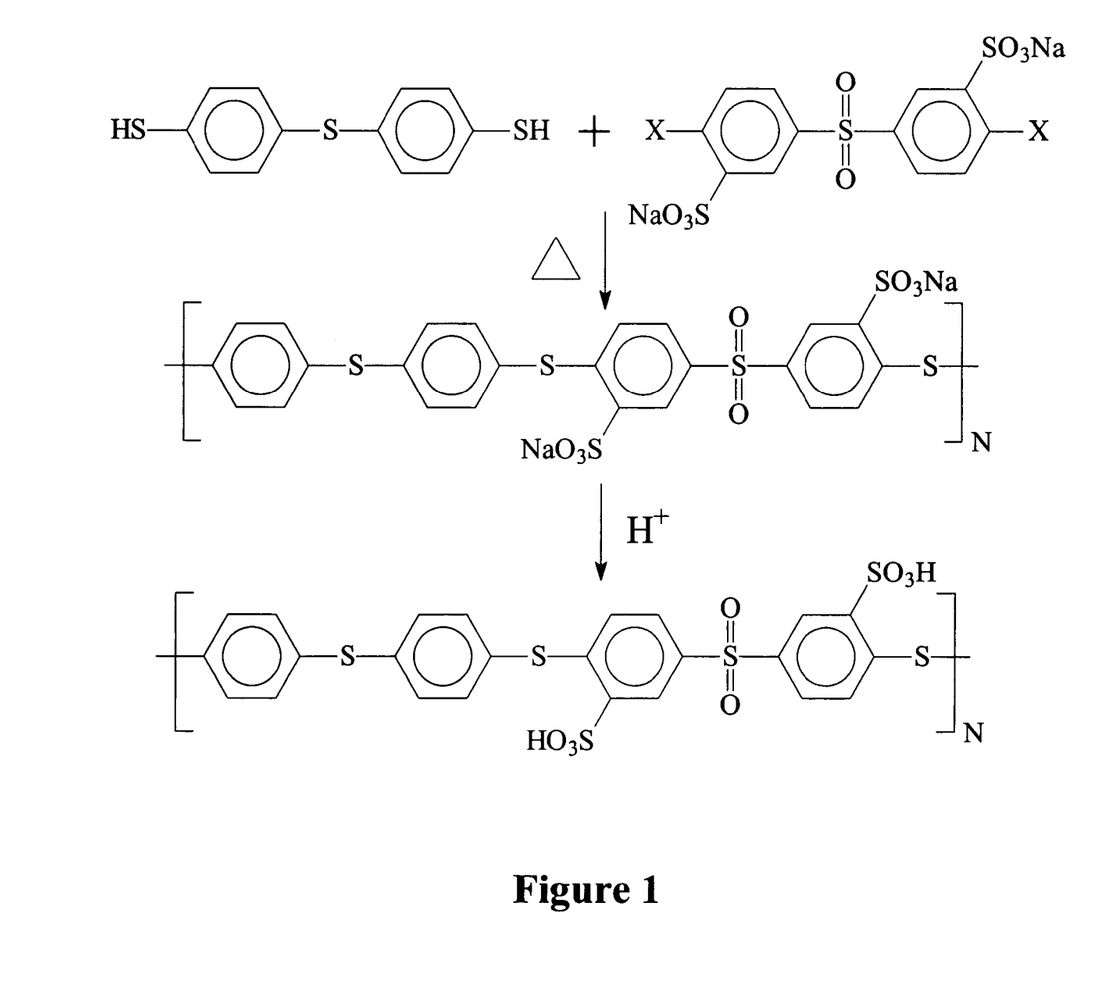
FIG. 1 is a diagram showing a reaction sequence for making one embodiment of the sulfonated polyarylenethioethersulfone polymer (without endcapping group) of the present invention.
Figure 3:
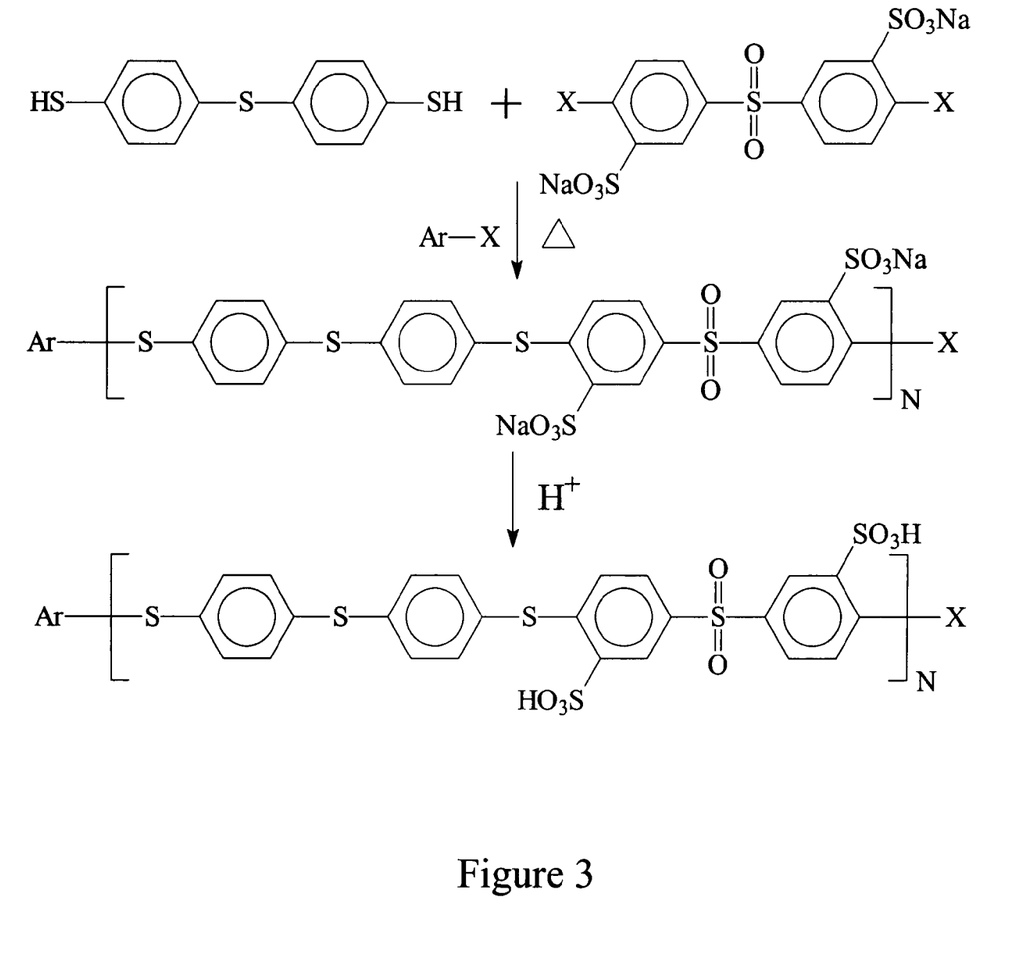
FIG. 3 is a diagram showing a reaction sequence for making one embodiment of the sulfonated polyarylenethioethersulfone polymer (one side endcapping) of the present invention.
Figure 4:
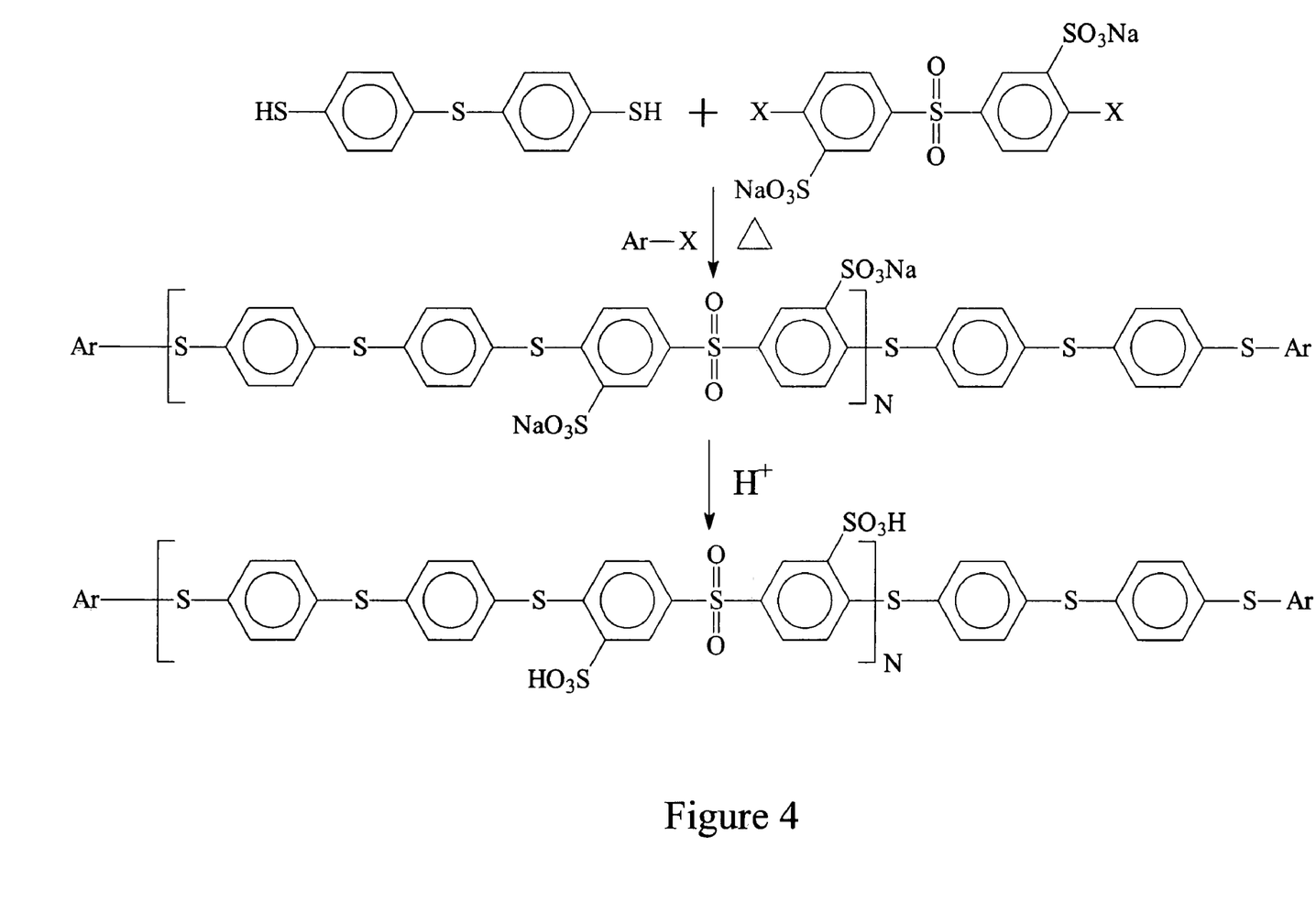
FIG. 4 is a diagram showing a reaction sequence for making one embodiment of the sulfonated polyarylenethioethersulfone polymer (both sides endcapping) of the present invention.

Sulfonated polyarylenethioethersulfone polymers according to the present invention were synthesized using difunctional sulfonated diphenylsulfone, difunctional thiobisbenzenthiol in polar aprotic solvents, such as sulfolane, at the polymer concentration in range of 10-20 wt % under a dry nitrogen atmosphere. Highly viscous polymer dopes were obtained after heating for one or more hours at 160-190° C., which, after work-up, formed white, fibrous polymers. Table 1 summarizes the properties of synthesized sulfonic acid pendent polymers by this method. The general reaction scheme for the synthesis of sulfonated polyarylenethioethersulfone polymers is shown in FIGS. 1, 3, and 4.

Additional sulfonated polyarylenethioethersulfone copolymers were synthesized using difunctional sulfonated diphenylsulfone, difunctional diphenylsulfone, and difunctional thiobisbenzenethiol in polar aprotic solvents, such as sulfolane, at the polymer concentration in range of 10-30 wt % under a dry nitrogen atmosphere. Highly viscous polymer dopes were obtained after heating for two or more hours at 120-180° C., which formed white, fibrous polymers. Table 2 summarizes the properties and thermal characteristics of various sulfonic acid pendent copolymers made by this method.

Figure 2:
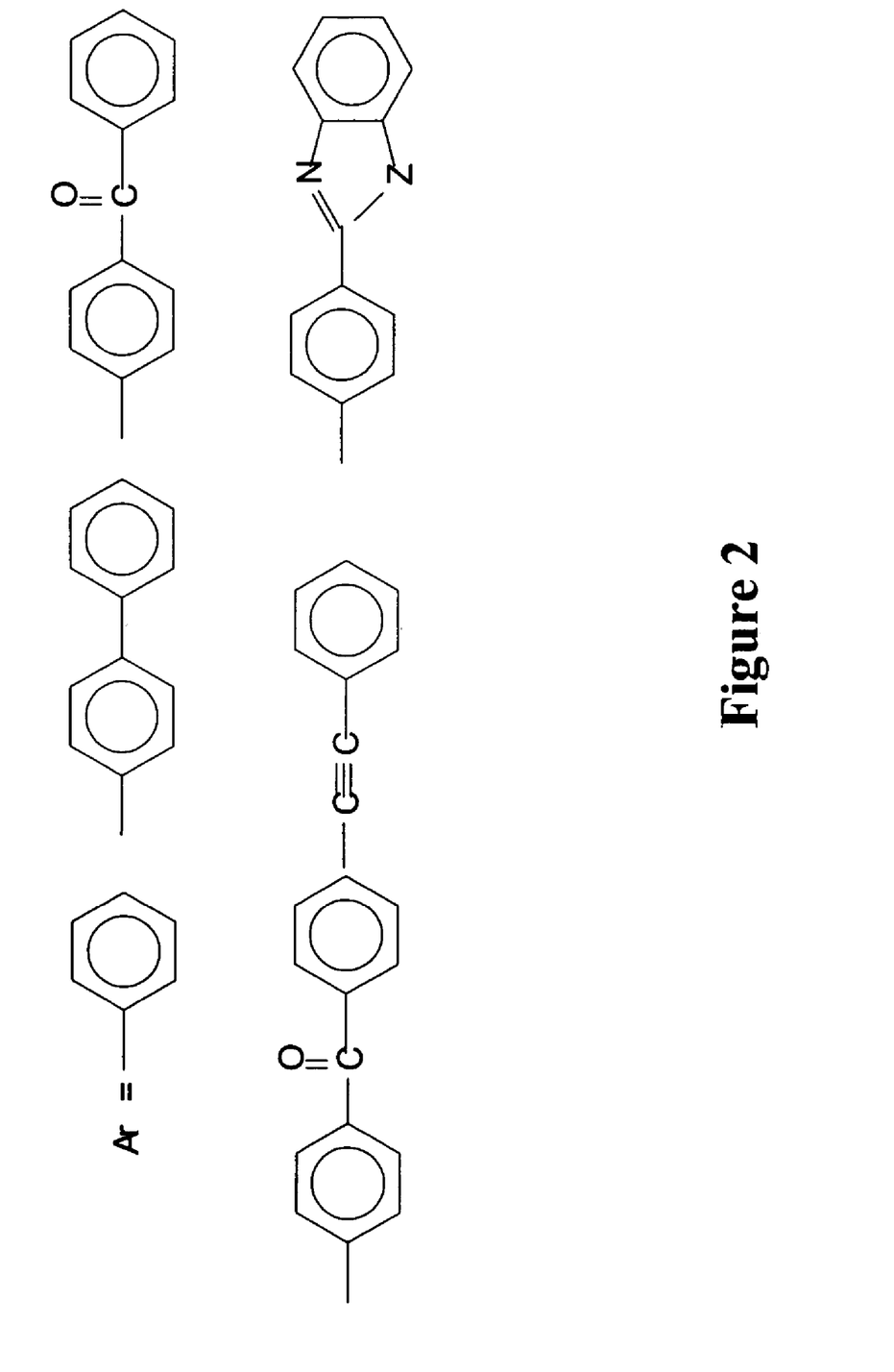
FIG. 2 is a diagram showing the chemical structure of suitable end-capping groups for the sulfonated polyarylenethioethersulfone polymers and copolymers of the present invention.

The sulfonated polyarylenethioethersulfone polymers and copolymers can be end-capped, if desired. End-capping the sulfonated polyarylenethioethersulfone polymers and copolymers with an unsubstituted phenyl-based end-capping agent (Ar-X, Ar=aromatic group; X=F, Cl) improves the thermal stability of the polymers, as well as decreasing their water solubility. The solubility characteristics of the polymers with end-capping groups varied depending on the end-capping group used. Suitable phenyl-based groups in the end-capping agent include, but are not limited to, phenyl, biphenyl, benzophenone, benzothiazole, benzoimidazole, benzoxazole, phenylethynyl benzophenone. Suitable chemical structures for the end-capping agents are shown in FIG. 2 (where Z=O, S, NH).

End-capping can be accomplished using about 1 to about 2 mol % of a phenyl-based monohalide end-capping agent (Ar-X). General reaction schemes for the synthesis of sulfonated polyarylenethioethersulfone polymers with end-capping are shown in FIGS. 3 and 4 (where X=F, Cl). The conductivity and solubility of sulfonated polyarylenethioethersulfone polymers are shown in Table 3.

Figure 5:
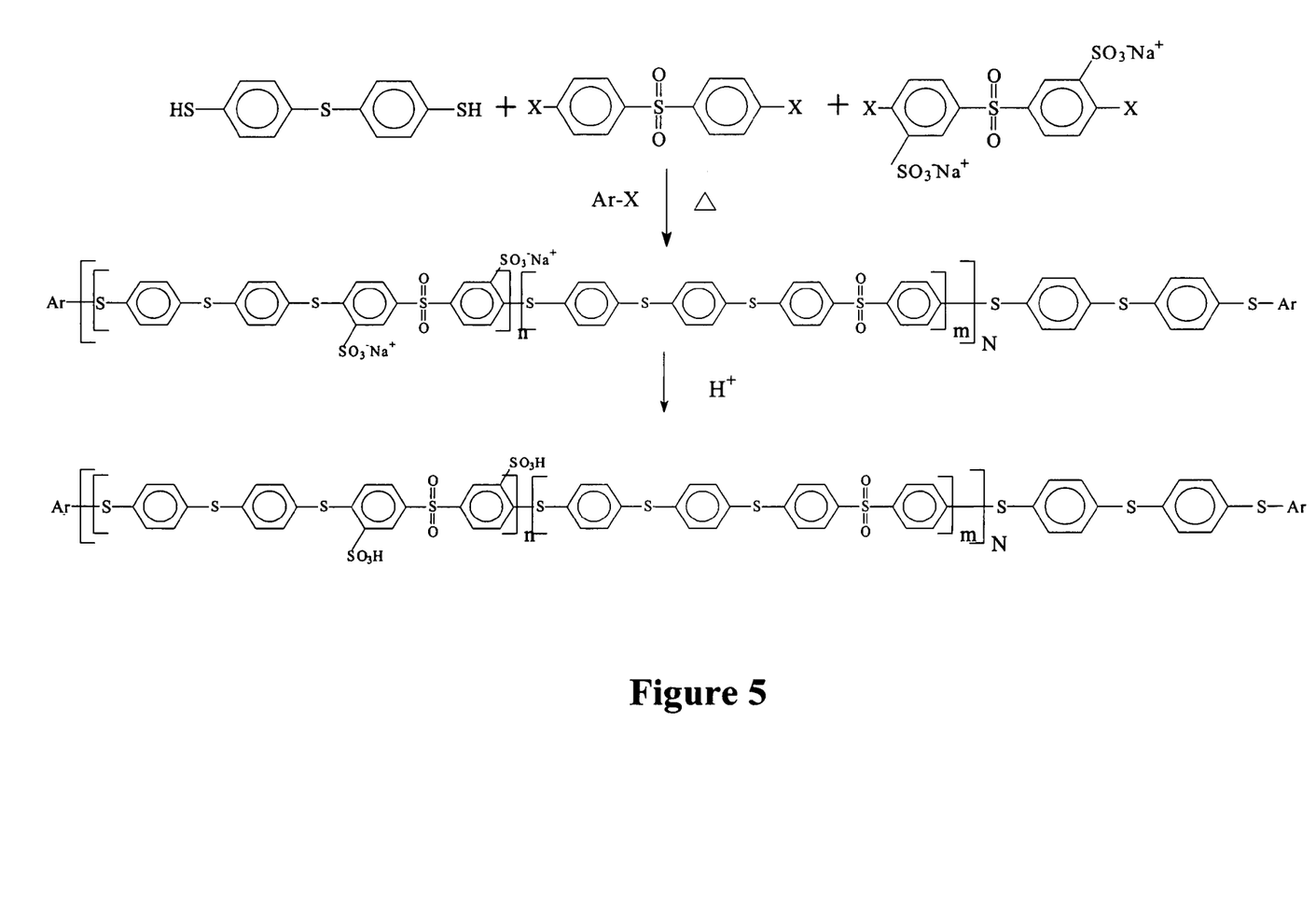
FIG. 5 is a diagram showing a reaction sequence for making another embodiment of the end-capped sulfonated polyarylenethioethersulfone copolymer (both sides endcapping) of the present invention.
Figure 6:
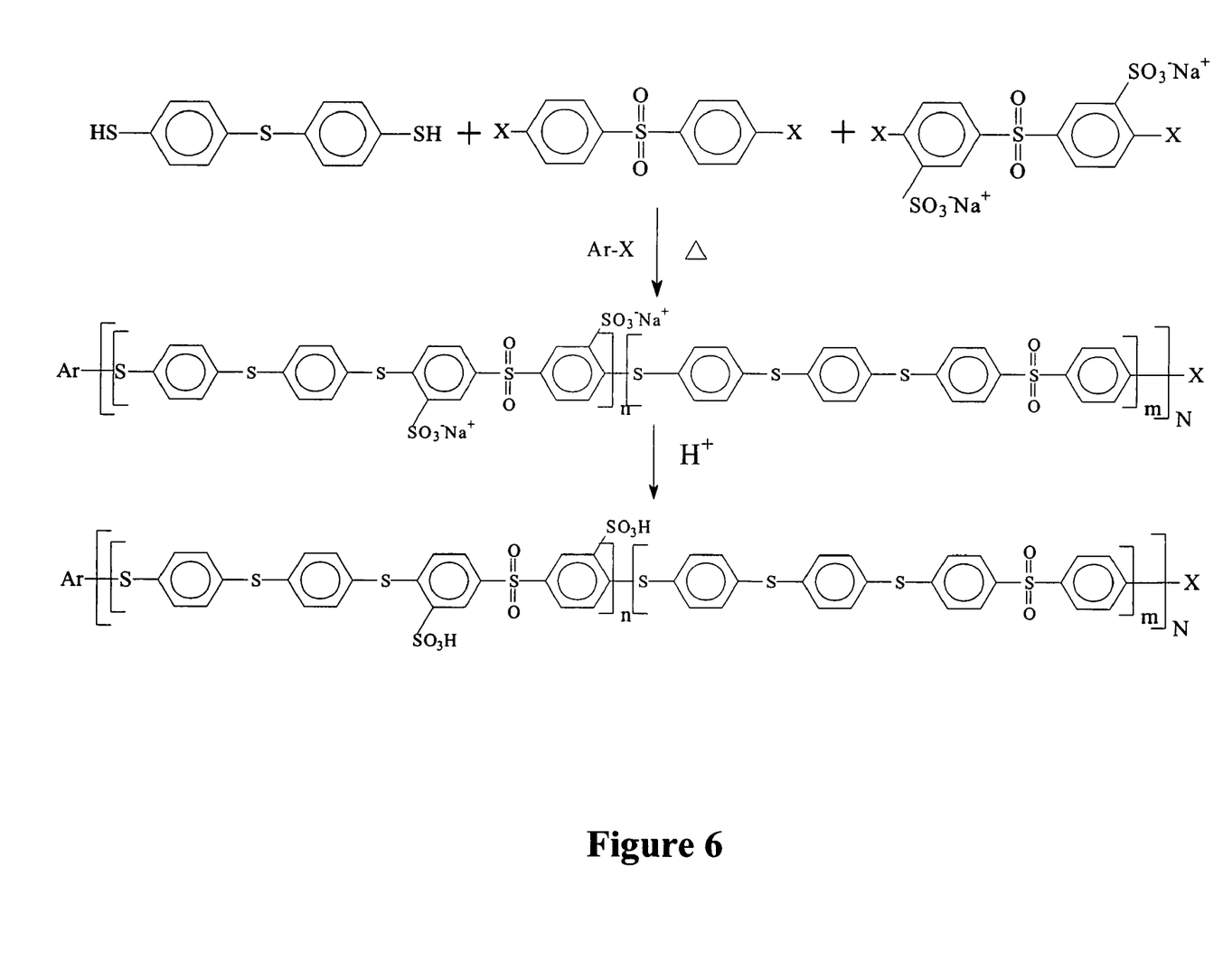
FIG. 6 is a diagram showing a reaction sequence for making another embodiment of endcapped sulfonated polyarylenethioethersulfone copolymer (one side endcapping) of the present invention.
Figure 7:
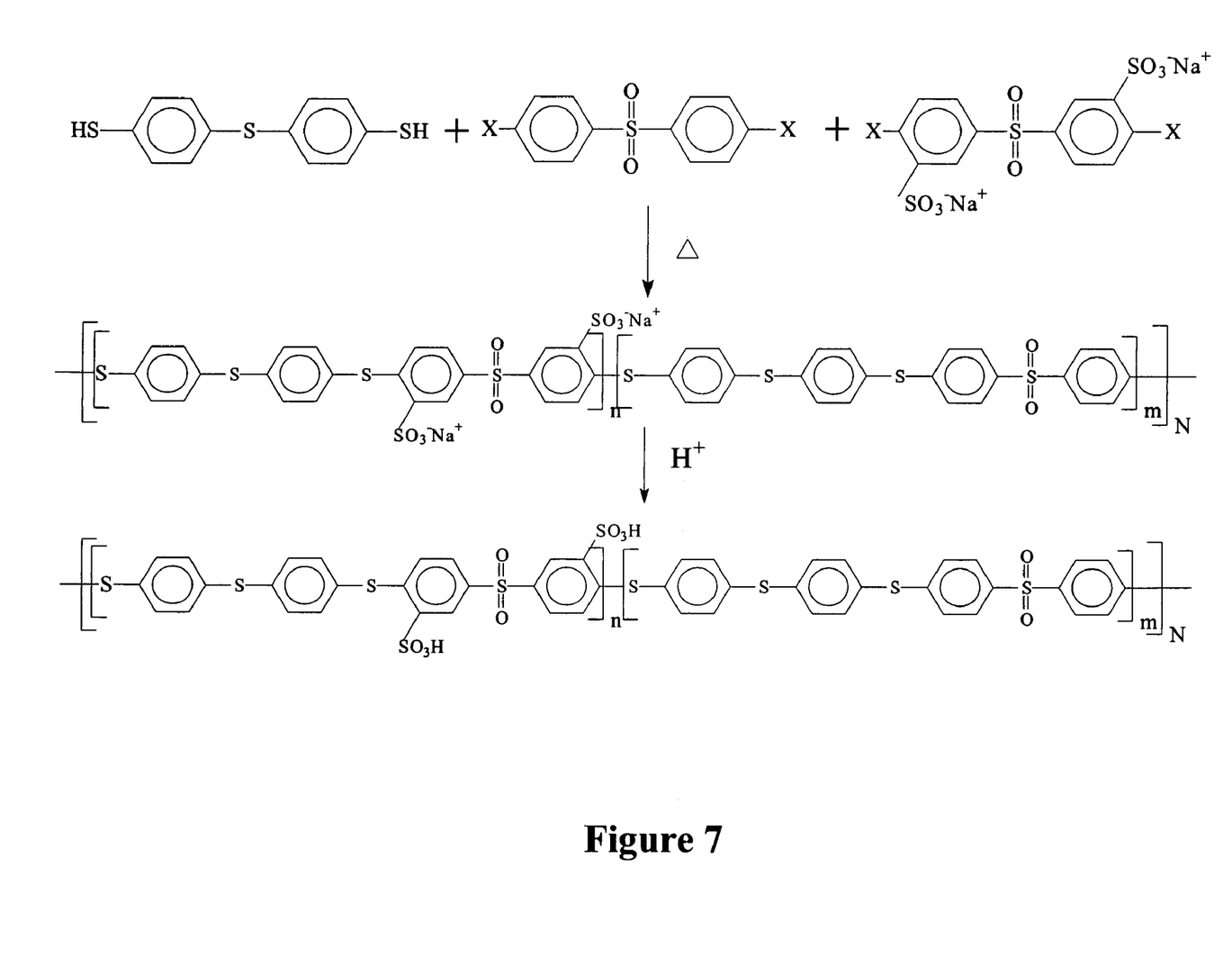
FIG. 7 is a diagram showing one reaction sequence for making another embodiment of the sulfonated polyarylenethioethersulfone copolymer (without end-capping) of the present invention.

General reaction schemes for the synthesis of various sulfonated polyarylenethioethersulfone copolymers with end-capping are shown in FIGS. 5 and 6 (where n=0.5 to about 1, m=1−n, and X=F, Cl). A general reaction scheme for the synthesis of sulfonated polyarylenethioethersulfone copolymers containing less than 50 mol % sulfonated monomers without end-capping is shown in FIG. 7 (where n<0.5, m=1−n, and X=F, Cl). The conductivity and solubility of the sulfonated polyarylenethioethersulfone copolymers are shown in Table 4.

The amount of the sulfonated monomer in the sulfonated polyarylenethioethersulfone copolymers also affected solubility. When the copolymer compositions without the end-capping groups contained less than 50 mol % of the sulfonated monomer, the copolymers were not soluble in water or methanol, but were soluble in N,N-dimethylacetamide, and N-methylpyrrolidinone at room temperature. When the copolymer compositions without end-capping groups contained 50 mol % or more sulfonated monomer, the copolymers were soluble in water, methanol, and organic solvents. When the copolymer compositions with end-capping groups contained 50 mol % or more sulfonated monomer, the copolymers were insoluble in water and methanol, and were soluble in N,N-dimethylacetamide, and N-methylpyrrolidinone at room temperature.

The sulfonated polyarylenethioethersulfone copolymers generally contain greater than 40 mol % sulfonated monomer, typically greater than about 50 mol %, more typically greater than about 60 mol %, more typically greater than about 70 mol %, and more typically greater than about 80 mol %.

EXAMPLE I

Synthesis of Sulfonated Polyarylenethioethersulfone Polymer without End-Capping Group (SPTES 100)

Disodium 3,3'-disulfonate-4,4'-difluorodiphenylsulfone (4.5833 g, 0.01 mol), 4,4'-thiobisbenzenethiol (2.5041 g, 0.01 mol), and anhydrous potassium carbonate (3.0406 g, 0.022 mol) were charged in a 250 mL round-bottom flask which was maintained under a back pressure of nitrogen. The flask was equipped with a magnetic stirrer and an oil bath on a hot plate. 120 mL of sulfolane was added to the flask, and stirred for 30 min. at room temperature and for 1 hour at 100° C. The reaction mixture was heated to 160-180° C. for 1-5 hours, cooled to room temperature upon which precipitation occurred, and quenched with acetic acid. The polymer was collected by dissolving in a small amount of water (room temperature), and reprecipitated in methanol. The polymer was filtered, soxhlet-extracted with methanol for 72 hours, and dried in a vacuum at 80° C. overnight. The yield was 87.7%.

EXAMPLE II

Synthesis of Sulfonated Polyarylenethioethersulfone Polymer without End-Capping Group (SPTES 100)

Disodium 3,3'-disulfonate-4,4'-dichlorodiphenylsulfone (1.9650 g, 0.004 mol), 4,4'-thiobisbenzenethiol (1.0016 g, 0.004 mol), and anhydrous potassium carbonate (1.6585 g, 0.012 mol) were charged in a 50 mL round-bottom flask which was maintained under a back pressure of nitrogen. The flask was equipped with a magnetic stirrer and an oil bath on a hot plate. 24 mL of sulfolane was added to the flask, and stirred for 1 hour at room temperature and for 1 hour at 120° C. The reaction mixture was heated to 160-180° C. for 1.5-3 hours, cooled to room temperature, quenched with acetic acid, and precipitated in methanol. The polymer was collected by filtration, air-dried, dissolved in a small amount of water (room temperature), and reprecipitated in methanol. The polymer was filtered, soxhlet-extracted with methanol for 72 hours, and dried in a vacuum at 80° C. overnight. The yield was 85.2%.

EXAMPLE III

Synthesis of Sulfonated Polyarylenethioethersulfone Polymer with End-Capping Group (End-Capped SPTES 100)

Disodium 3,3'-disulfonate-4,4'-difluorodiphenylsulfone (1.3750 g, 0.003 mol), 4,4'-thiobisbenzenethiol (0.7512 g, 0.003 mol), and anhydrous potassium carbonate (1.1056 g, 0.008 mol) were charged in a 50 mL round-bottom flask which was maintained under a back pressure of nitrogen. The flask was equipped with a magnetic stirrer and an oil bath on a hot plate. 30 mL of sulfolane was added to the flask, and stirred for 45 min. at room temperature and for 1 hour at 140° C. 4-fluorobenzophenone (0.006 g, 0.00003 mol) was added. The reaction mixture was heated to 160-180° C. for 1.5-3 hours, cooled to room temperature, quenched with acetic acid, and precipitated in methanol. The polymer was collected by filtration, air-dried, dissolved in boiling water, and reprecipitated in methanol. The polymer was filtered, soxhlet-extracted with methanol for 48 hours, and dried in a vacuum at 80° C. overnight. The yield was 84.0%.

EXAMPLE IV

Synthesis of Sulfonated Polyarylenethioethersulfone Polymer with End-Capping Group (End-Capped SPTES 100)

Disodium 3,3'-disulfonate-4,4'-dichlorodiphenylsulfone (1.4737 g, 0.003 mol), 4,4'-thiobisbenzenethiol (0.7512 g, 0.003 mol), and anhydrous potassium carbonate (1.3821 g, 0.010 mol) were charged in a 50 mL round-bottom flask which was maintained under a back pressure of nitrogen. The flask was equipped with a magnetic stirrer and an oil bath on a hot plate. 30 mL of sulfolane was added to the flask, which was stirred for 45 min. at room temperature and for 1 hour at 140° C. 4-chlorobenzophenone (0.006 g, 0.00003 mol) was added to the solution. The reaction mixture was heated to 160-180° C. for 1.5-3 hours, cooled to room temperature, quenched with acetic acid, and precipitated in methanol. The polymer was collected by filtration, air-dried, dissolved in boiling water, and reprecipitated in methanol. The polymer was filtered, soxhlet-extracted with methanol for 48 hours, and dried in a vacuum at 80° C. overnight. The yield was 86.5%.

EXAMPLE V

Synthesis of Sulfonated Polyarylenethioethersulfone Copolymer with End-Capping Group (End-Capped SPTES 80)

Disodium 3,3'-disulfonate-4,4'-difluorodiphenylsulfone (3.6666 g, 0.008 mol), 4,4'-difluorodiphenylsulfone (0.5085 g, 0.002 mol), 4,4'-thiobisbenzenethiol (2.5041 g, 0.01 mol), and anhydrous potassium carbonate (2.7642 g, 0.02 mol) were charged in a 250 mL round-bottom flask which was maintained under a back pressure of nitrogen. The flask was equipped with a magnetic stirrer and an oil bath on a hot plate. 100 mL of sulfolane was added to the flask, and the mixture was stirred for 45 min. at room temperature and for 1 hour at 140° C. 4-chlorobenzophenone (0.002 g, 0.00001 mol) was added. The reaction mixture was heated to 160° C. for 3.5 hours, cooled to room temperature, and precipitated in methanol and acetic acid (10% methanol). The polymer was filtered, soxhlet-extracted with methanol for 24 hours, and dried in a vacuum at 80° C. overnight. The yield was 93.7%.

EXAMPLE VI

Synthesis of Sulfonated Polyarylenethioethersulfone Copolymer with End-Capping Group (End-Capped SPTES 70)

Disodium 3,3'-disulfonate-4,4'-dichlorodiphenylsulfone (3.4386 g, 0.007 mol), 4,4'-dichlorodiphenylsulfone (0.8614 g, 0.004 mol), 4,4'-thiobisbenzenethiol (2.5041 g, 0.01 mol), and anhydrous potassium carbonate (3.0406 g, 0.022 mol) were charged in a 100 mL round-bottom flask which was maintained under a back pressure of nitrogen. The flask was equipped with a magnetic stirrer and an oil bath on a hot plate. 75 mL of sulfolane was added to the flask, and the mixture was stirred for 1 hour at room temperature and for 1 hour at 120° C. 4-chlorobenzophenone (0.002 g, 0.00001 mol) was added. The reaction mixture was heated to 160° C. for 4.5 hours, cooled to room temperature, and precipitated in methanol and acetic acid (10% methanol). The polymer was filtered, soxhlet-extracted with methanol for 24 hours, and dried in a vacuum at 80° C. overnight. The yield was 92.2%.

EXAMPLE VII

Synthesis of Sulfonated Polyarylenethioethersulfone Copolymer with End-Capping Group (End-Capped SPTES 60)

Disodium 3,3'-disulfonate-4,4'-dichlorodiphenylsulfone (2.9474 g, 0.006 mol), 4,4'-dichlorodiphenylsulfone (1.1486 g, 0.004 mol), 4,4'-thiobisbenzenethiol (2.5041 g, 0.01 mol), and anhydrous potassium carbonate (3.0406 g, 0.022 mol) were charged in a 100 mL round-bottom flask which was maintained under a back pressure of nitrogen. The flask was equipped with a magnetic stirrer and an oil bath on a hot plate. 70 mL of sulfolane was added to the flask, and the mixture was stirred for 1 hour at room temperature and for 1 hour at 120° C. 4-chlorobenzophenone (0.002 g, 0.00001 mol) was added. The reaction mixture was heated to 160° C. for 3.5 hours, cooled to room temperature, and precipitated in methanol and acetic acid (10% methanol). The polymer was filtered, soxhlet-extracted with methanol for 24 hours, and dried in a vacuum at 80° C. overnight. The yield was 95.2%.

EXAMPLE VIII

Synthesis of Sulfonated Polyarylenethioethersulfone Copolymer with End-Capping Group (End-Capped SPTES 50)

Disodium 3,3'-disulfonate-4,4'-difluorodiphenylsulfone (2.2916 g, 0.005 mol), 4,4'-difluorodiphenylsulfone (1.2712 g, 0.005 mol), 4,4'-thiobisbenzenethiol (2.5041 g, 0.01 mol), and anhydrous potassium carbonate (2.7642 g, 0.02 mol) were charged in a 100 mL round-bottom flask which was maintained under a back pressure of nitrogen. The flask was equipped with a magnetic stirrer and an oil bath on a hot plate. 60 mL of sulfolane was added to the flask, and the mixture was stirred for 45 min. at room temperature and for 1 hour at 140° C. 4-fluorobenzophenone (0.002 g, 0.00001 mol) was added. The reaction mixture was heated to 160-180° C. for 2.5 hours, cooled to room temperature, and precipitated in methanol and acetic acid (10% methanol). The polymer was filtered, soxhlet-extracted with methanol for 48 hours, and dried in a vacuum at 80° C. overnight. The yield was 94.0%.

EXAMPLE IX

Synthesis of Sulfonated Polyarylenethioethersulfone Copolymer without End-Capping Group (SPTES 40)

Disodium 3,3'-disulfonate-4,4'-dichlorodiphenylsulfone (1.9650 g, 0.004 mol), 4,4'dichlorodiphenylsulfone (1.7230 g, 0.006 mol), 4,4'-thiobisbenzenethiol (2.5041 g, 0.01 mol), and anhydrous potassium carbonate (3.0406 g, 0.022 mol) were charged in a 100 mL round-bottom flask which was maintained under a back pressure of nitrogen. The flask was equipped with a magnetic stirrer and an oil bath on a hot plate. 65 mL of sulfolane was added to the flask, and the mixture was stirred for 45 min. at room temperature and for 1 hour at 140° C. The reaction mixture was heated to 190° C. for 3.5 hours, cooled to room temperature, and precipitated in methanol and acetic acid (10% methanol). The polymer was filtered, soxhlet-extracted with methanol for 48 hours, and dried in a vacuum at 80° C. overnight. The yield was 88.5%.

Polymer Processing and Characterization

The sulfonated salts of the polymer and copolymer with or without the end-capping group can be dissolved in N,N-dimethylacetamide (DMAc), and N-methylpyrrolidinone (NMP). By a solution casting process, tough, clear, flexible membranes of the sulfonated polyarylenethioethersulfone polymer and copolymer with or without the end-capping could be fabricated from DMAc or NMP solutions. The salt form membranes were converted to the corresponding sulfonic acids in the presence of sulfuric acid such as dilute sulfuric acid solution. The membrane properties of the sulfonated polyarylenethioethersulfone polymers and copolymers are shown in Table 1 and Table 2 respectively. The compositions showed good agreement with trace or zero values of sodium elemental analysis for quantitative conversion to sulfonic acids.

TABLE 2

Properties and Thermal Characteristics of Sulfonated Polyarylenethioethersulfone Copolymers

| Sulfonated Polymers | Intrinsic Viscosity (dL/g) | Mn (GPC) | Mw/Mn (GPC) | TGA $T_{sd}/T_d$ (Max. ° C., Air) | Flim Behaviors |
|---|---|---|---|---|---|
| Example V | 1.86 | 41.0 K | 2.17 | 294/446 | Transparent, flexible, tough |
| Example VI | 1.62 | 38.7 K | 2.27 | 283/440 | Transparent, flexible, tough |
| Example VII | 1.65 | 39.7 K | 2.21 | 273/451 | Transparent, flexible, tough |
| Example VIII | 1.82 | 38.3 K | 2.24 | 278/453 | Transparent, flexible, tough |
| Example IX | 0.98 | 19.7 K | 3.24 | 282/467 | Transparent, flexible, tough |

Gel permeation chromatography was used to determine molecular weights and molecular weight distributions, $M_w/M_n$, of synthesized polymer samples with respect to polystyrene standards. $M_w$ measurement was performed on TriSEC Version 3.00 in NMP, 0.5% LiBr at 30° C. Intrinsic viscosity was measured at 30° C. in NMP, 0.5% LiBr using an Ubbelohde Viscometer. The results of the sulfonated polyarylenethioethersulfone polymer with and without the endcapping are shown in Table 1. The results of the sulfonated polyarylenethioethersulfone copolymer with and without the endcapping are shown in Table 2.

EXAMPLE X

Preparation of Sulfonated Polyarylenethioethersulfone Polymer and Copolymer Membranes The sulfonated salts of polyarylenethioethersulfone polymer and copolymer with and without the end-capping groups were dissolved in NMP or DMAc at room temperature or heated up to 100° C. to a clear solution. The

TABLE 1

Properties, Elemental Analysis, and Thermal Characteristics of Sulfonic Acid Pendent Arylenethioethersulfone Polymers

| Sulfonated Polymers | Inherent Viscosity (dL/g, 30° C., NMP) | Elemental Analaysis (Sodium %) | Mn (GPC) | Mw/Mn (GPC) | TGA, $T_d$ (Max, ° C., Air) | Film Properties |
|---|---|---|---|---|---|---|
| Example I | 2.54 | 0.163 | 43 | 3.67 | 436 | transparent, flexible, tough |
| Example II | 1.94 | 0.037 | 33 | 3.12 | 437 | transparent, flexible, tough |
| Example III | 1.89 | 0.083 | 41 | 2.29 | 424 | transparent, flexible, tough |
| Example IV | 1.84 | 0.153 | 38 | 2.21 | 427 | transparent, flexible, tough | membranes were cast in a flat dish at 80° C. in vacuum for 24 hours. The clear membranes were converted to the corresponding sulfonic acids in the presence of diluted sulfuric acid at room temperature for 48 hours. The membranes were dried at room temperature, then at 100° C. in vacuum for 24 hours. The tough, clear, flexible membranes of the sulfonated polyarylenethioethersulfone polymer and copolymer with and without the endcapping were fabricated.

The conductivity of the membranes was measured using AC Impedance Spectroscopy and utilized a standard four-electrode measurement setup to eliminate electrode and interfacial effects. The Teflon® sample fixture was placed inside a temperature and humidity controlled oven, and it was fabricated so that the sample was exposed to the humidified air in the chamber. The two outer electrodes were made of platinum foil, and they acted to source the current in the sample. Two inner platinum wire electrodes were spaced 1 cm apart and were used to measure the voltage drop across a known distance. By measuring the impedance of the material as a function of frequency at a set temperature and humidity, the conductivity of the membrane was obtained using the magnitude of the impedance in a region where the phase angle is effectively zero. The proton conductivity, measured at 65° C. and 85% relative humidity, of membranes of the sulfonated polyarylenethioethersulfone polymer with and without the endcapping is shown in Table 3. The proton conductivity, measured at 65° C. and 85% relative humidity, of membranes of the sulfonated polyarylenethioethersulfone copolymer with and without the endcapping is shown in Table 4.

TABLE 3

Proton Conductivity and Solubility of Sulfonic Acid Pendent Arylenethioethersulfone Polymers*

| Sulfonated Polymers | Proton Conductivity (mS/cm) | Water Solubility | Soluble in organic solvent |
|---|---|---|---|
| Example I | 420 | Y | NMP, DMAc, DMF, MeOH |
| Example II | 300 | Y | NMP, DMAc, DMF, MeOH |
| Example III | 380 | N/S | NMP, DMAc, DMF, DMSO |
| Example IV | 360 | N/S | NMP, DMAc, DMF, DMSO |
| Commercial Nafion ® 117 | 80 | N | N |

*Samples were tested at 65° C., and 85% relative humidity
N = insoluble,
S = Swollen,
Y = Soluble The solubility of the sulfonated polyarylenethioethersulfone polymer with and without the endcapping was tested at room temperature. It was found that the solubility characteristics of the polymers with endcapping varied depending on the endcapping compound used.

TABLE 4

Proton Conductivity and Solubility of Sulfonated Polyarylenethioethersulfone Copolymers*

| Sulfonated polymers | Proton Conductivity (mS/cm) | Water Solubility | Organic Solvent Solubility (NMP, DMAc) |
|---|---|---|---|
| Example V | 210 | N | Y |
| Example VI | 178 | N | Y |
| Example VII | 145 | N | Y |
| Example VIII | 100 | N | Y |
| Example IX | 60 | N | Y |
| Commercial Nafion ® 117 | 80 | N | N |

*The proton conductivity was tested at 65° C., 85% relative humidity.
N = insoluble,
S = Swollen,
Y = Soluble.

Figure 8:
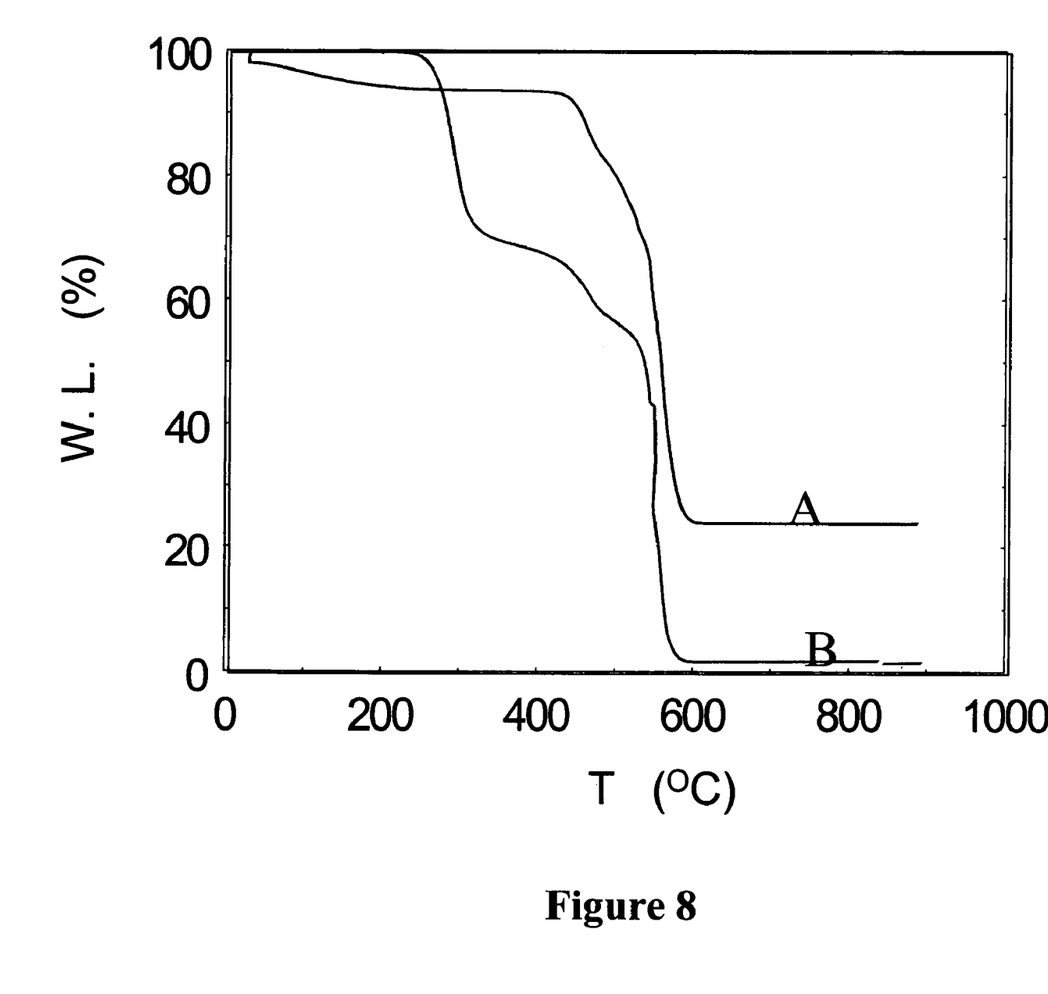
FIG. 8 is a graph showing the TGA (In Air) of one embodiment of a synthesized sulfonated polyarylenethioethersulfone polymer of the present invention.
Figure 9:
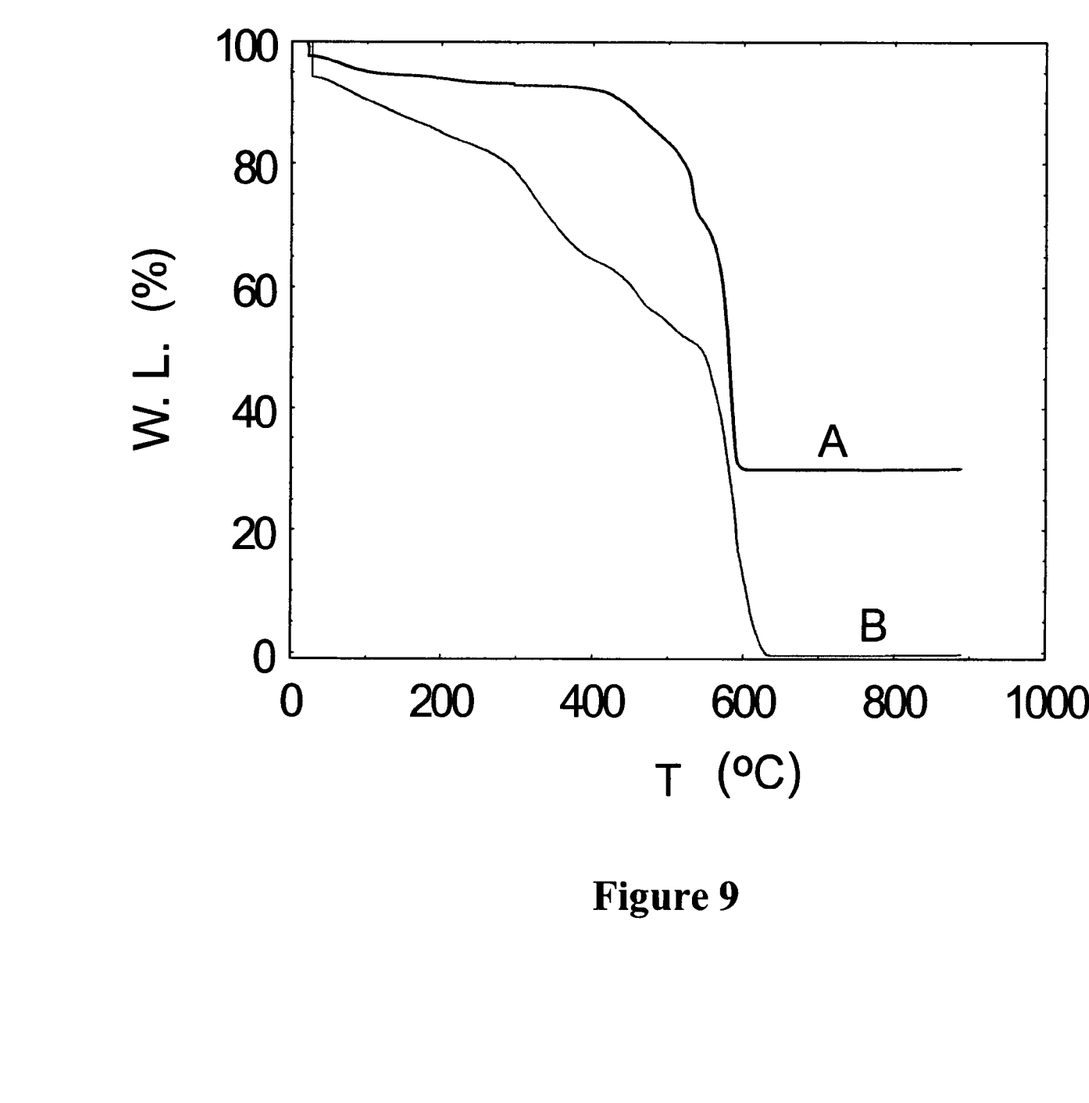
FIG. 9 is a graph showing the TGA (In Air) of one embodiment of a synthesized sulfonated polyarylenethioethersulfone copolymer of the present invention.

Thermogravimetric was conducted using an Auto TGA 2950HR V5.4A instrument in Air and Helium at a heating rate of 10° C./min. As an example, the TGA (weight loss (W.L.) in % v. temperature (T) in ° C. of a sulfonated polyarylenethioethersulfone polymer and copolymer is shown in FIGS. 8 (SPTES 100 in air—Example I) and 9 (SPTES 50 in air—Example VIII) (where A is the Na salt form and B is the free acid form). In FIGS. 8 and 9, for the Na salt form curves (A), a white residue was left when the TGA was performed in air.

The type of aromatic dihalo functionality in the sulfonated monomer, either difluoro or dichloro groups, as well as whether the polymers and copolymers contained end-capping groups or not resulted in a wide variation in the proton conductivities, ranging from 60 mS/cm to 420 mS/cm, measured at 65° C., and 85% relative humidity. The polymer with the lowest proton conductivity, sulfonated polyarylenethioethersulfone copolymer containing 40% sulfonated monomer without end-capping, has a proton conductivity comparable to the state-of-the-art Nafion® proton exchange membrane under comparable conditions. Those containing higher amounts of sulfonated monomer had higher proton conductivity (greater than 100 mS/cm).

While certain representative embodiments and details have been shown for purposes of illustrating the invention, it will be apparent to those skilled in the art that various changes in the compositions and methods disclosed herein may be made without departing from the scope of the invention, which is defined in the appended claims.

What is claimed is:

1. A sulfonated polyarylenethioethersulfone polymer comprising:
   a reaction product consisting essentially of an aromatic dihalo functionality sulfonated monomer, an aromatic dithiol monomer.

2. The sulfonated polyarylenethioethersulfone polymer of claim 1 wherein the aromatic dihalo functionality sulfonated monomer comprises a sulfonic acid pendant-activated difunctional aromatic sulfone monomer.

3. The sulfonated polyarylenethioethersulfone polymer of claim 2 wherein the sulfonic acid pendant-activated difunctional aromatic sulfone monomer comprises a difunctional sulphonated diphenylsulfone.

4. The sulfonated polyarylenethioethersulfone polymer of claim 1 wherein the aromatic dihalo functionality sulfonated monomer is selected from disodium 3,3'-disulfonate-4,4'-difluorodiphenylsulfone, or disodium 3,3'-disulfonate-4,4'-dichlorodiphenylsulfone.

5. The sulfonated polyarylenethioethersulfone polymer of claim 1 wherein the aromatic dithiol monomer is a bisbenzenethiol.

6. The sulfonated polyarylenethioethersulfone polymer of claim 5 wherein the bisbenzenethiol is a difunctional thiobisbenzenethiol.

7. The sulfonated polyarylenethioethersulfone polymer of claim 6 wherein the difunctional thiobisbenzenethiol is 4,4'-thiobisbenzenethiol.

8. The sulfonated polyarylenethioethersulfone polymer of claim 1 wherein the reaction product is end-capped with an end-capping agent.

9. The sulfonated polyarylenethioethersulfone polymer of claim 8 wherein the end-capping agent is a phenyl-based monohalide end-capping agent.

10. The sulfonated polyarylenethioethersulfone polymer of claim 9 wherein the phenyl-based monohalide end-capping agent includes a phenyl-based group selected from phenyl, biphenyl, benzophenone, benzothiazole, benzoimidazole, benzoxazole, or phenylethynyl benzophenone.

11. A membrane made from the polymer of claim 1.

12. A membrane made from the polymer of claim 8.

13. A sulfonated polyarylenethioethersulfone polymer or copolymer comprising:
a reaction product of an aromatic dihalo functionality sulfonated monomer, an aromatic dithiol monomer, and optionally an aromatic dihalo functionality monomer;
wherein the reaction product is end-capped with an end-capping agent.

14. The sulfonated polyarylenethioethersulfone polymer or copolymer of claim 13 wherein the aromatic dihalo functionality sulfonated monomer comprises a sulfonic acid pendant-activated difunctional aromatic sulfone monomer.

15. The sulfonated polyarylenethioethersulfone polymer or copolymer of claim 14 wherein the sulfonic acid pendant-activated difunctional aromatic sulfone monomer comprises a difunctional sulphonated diphenylsulfone.

16. The sulfonated polyarylenethioethersulfone polymer or copolymer of claim 13 wherein the aromatic dihalo functionality sulfonated monomer is selected from disodium 3,3'-disulfonate-4,4'-difluorodiphenylsulfone, or disodium 3,3'-disulfonate-4,4'-dichlorodiphenylsulfone.

17. The sulfonated polyarylenethioethersulfone polymer or copolymer of claim 13 wherein the aromatic dithiol monomer is a bisbenzenethiol.

18. The sulfonated polyarylenethioethersulfone polymer or copolymer of claim 17 wherein the bisbenzenethiol is a difunctional thiobisbenzenethiol.

19. The sulfonated polyarylenethioethersulfone polymer or copolymer of claim 18 wherein the difunctional thiobisbenzenethiol is 4,4'-thiobisbenzenethiol.

20. The sulfonated polyarylenethioethersulfone polymer or copolymer of claim 13 wherein the end-capping agent is a phenyl-based monohalide end-capping agent.

21. The sulfonated polyarylenethioethersulfone polymer or copolymer of claim 20 wherein the phenyl-based monohalide end-capping agent includes a phenyl-based group selected from phenyl, biphenyl, benzophenone, benzothiazole, benzoimidazole, benzoxazole, or phenylethynyl benzophenone.

22. The sulfonated polyarylenethioethersulfone polymer or copolymer of claim 13 wherein the aromatic dihalo functionality monomer comprises a difunctional aromatic sulfone monomer.

23. The sulfonated polyarylenethioethersulfone polymer or copolymer of claim 22 wherein the difunctional aromatic sulfone monomer comprises a difunctional diphenylsulfone.

24. The sulfonated polyarylenethioethersulfone polymer or copolymer of claim 13 wherein the aromatic dihalo functionality monomer is selected from difluoro aromatic sulfone monomers or dichloro aromatic sulfone monomers.

25. The sulfonated polyarylenethioethersulfone polymer or copolymer of claim 13 wherein the aromatic dihalo functionality monomer is selected from 4,4'-difluorodiphenylsulfone, or 4,4'-dichlorodiphenylsulfone.

26. The sulfonated polyarylenethioethersulfone polymer or copolymer of claim 13 wherein the sulfonated polyarylenethioethersulfone copolymer includes the aromatic dihalo functionality monomer and contains greater than about 40 mol % reacted aromatic dihalo functionality sulfonated monomer.

27. The sulfonated polyarylenethioethersulfone polymer or copolymer of claim 13 wherein the sulfonated polyarylenethioethersulfone copolymer includes the aromatic dihalo functionality monomer and contains greater than about 50 mol % reacted aromatic dihalo functionality sulfonated monomer.

28. The sulfonated polyarylenethioethersulfone polymer or copolymer of claim 13 wherein the sulfonated polyarylenethioethersulfone copolymer includes the aromatic dihalo functionality monomer and contains greater than about 60 mol % reacted aromatic dihalo functionality sulfonated monomer.

29. The sulfonated polyarylenethioethersulfone polymer or copolymer of claim 13 wherein the sulfonated polyarylenethioethersulfone copolymer includes the aromatic dihalo functionality monomer and contains greater than about 70% reacted aromatic dihalo functionality sulfonated monomer.

30. The sulfonated polyarylenethioethersulfone polymer or copolymer of claim 13 wherein the sulfonated polyarylenethioethersulfone copolymer includes the aromatic dihalo functionality monomer and contains greater than about 80% reacted aromatic dihalo functionality sulfonated monomer.

31. A membrane made from the polymer or copolymer of claim 13.

* * * * *